(12) United States Patent
Patoux et al.

(10) Patent No.: US 8,703,332 B2
(45) Date of Patent: Apr. 22, 2014

(54) LITHIUM BATTERIES CONTAINING LITHIUM-BEARING IRON PHOSPHATE AND CARBON

(75) Inventors: Sébastien Patoux, Fontaine (FR); Sébastien Martinet, St. Quentin/Isère (FR); Sébastien Launois, Grenoble (FR); Alain Gourgue, Lincent (BE); Alain Germeau, Auderghem (BE); Isabelle Willems, Lesve (BE)

(73) Assignees: Prayon, Engis (BE); Commissariat à l'Énergie Atomique, Paris (FR)

( * ) Notice: Subject to any disclaimer, the term of this patent is extended or adjusted under 35 U.S.C. 154(b) by 0 days.

(21) Appl. No.: 13/574,754

(22) PCT Filed: Jan. 28, 2011

(86) PCT No.: PCT/EP2011/051203
§ 371 (c)(1),
(2), (4) Date: Oct. 15, 2012

(87) PCT Pub. No.: WO2011/092283
PCT Pub. Date: Aug. 4, 2011

(65) Prior Publication Data
US 2013/0040198 A1    Feb. 14, 2013

(30) Foreign Application Priority Data
Jan. 28, 2010  (EP) .................................... 10151986

(51) Int. Cl.
*H01M 4/13*    (2010.01)
(52) U.S. Cl.
USPC .......................................................... 429/217

(58) Field of Classification Search
None
See application file for complete search history.

(56) References Cited

U.S. PATENT DOCUMENTS

| 2007/0160519 A1* | 7/2007 | Barker et al. ................. 423/305 |
| 2009/0061314 A1* | 3/2009 | Dong ......................... 429/218.1 |
| 2009/0081549 A1* | 3/2009 | Liaw et al. .................... 429/222 |
| 2009/0130560 A1* | 5/2009 | Exnar et al. ................... 429/224 |

FOREIGN PATENT DOCUMENTS

| EP | 1193783 | 4/2002 |
| EP | 1195827 | 4/2002 |
| EP | 1261050 | 11/2002 |
| EP | 2075864 | 7/2009 |
| WO | 2008067677 | 6/2008 |
| WO | 2009117871 | 10/2009 |
| WO | 2010129417 | 11/2010 |

OTHER PUBLICATIONS

Kang et al., Optimized solid-state synthesis of LiFePO4 cathode materials using ball milling, Journal of Power Sources 179 (2008) 340-346 Available online Jan. 4, 2008.*

(Continued)

*Primary Examiner* — Patrick Ryan
*Assistant Examiner* — Jose Colucci Rios
(74) *Attorney, Agent, or Firm* — McCracken & Frank LLC

(57) ABSTRACT

The invention relates to lithium-bearing iron phosphate in the form of micrometric mixed aggregates of nanometric particles, to an electrode and cell resulting therefrom and to the method for manufacturing same, which is characterized by a nanomilling step.

8 Claims, 5 Drawing Sheets

(56) References Cited

OTHER PUBLICATIONS

Liu et al., Long-term cyclability of LiFePO4/carbon composite cathode material for lithium-ion battery applications, Electrochimica Acta 54 (2009) 5656-5659 Available online May 13, 2009.*

Zhang et al., Effect of milling method and time on the properties and electrochemical performance of LiFePO4/C composites prepared by ball milling and thermal treatment, Electrochimica Acta 55 (2010) 2653-2661 Available online Dec. 29, 2009.*

European Patent Office International Search Report dated Mar. 10, 2011, for International Patent Application No. PCT/EP2011/051203 (3 pages).

* cited by examiner

LITHIUM BATTERIES CONTAINING LITHIUM-BEARING IRON PHOSPHATE AND CARBON

The invention relates to a method for producing a composite electrode material comprising lithiated iron phosphate and carbon, to the aforesaid electrode material, as well as to a lithium battery including at least two electrodes based on different active materials, one of which is based on said composite electrode material comprising lithiated iron phosphate, and an electrolyte through which the $Li^+$ cations have the possibility of migrating from one electrode to the other depending on the use.

Lithium batteries are increasingly used as self-contained power sources, in particular in portable equipment, where they gradually replace nickel-cadmium (NiCd) and nickel-metal hydride (NiMH) batteries. This development is explained by continuous improvement in the performances of lithium batteries, thus giving them significantly greater power densities than those proposed by the NiCd and NiMH industry sectors. New generations of lithium batteries are already being developed for still more diversified applications (hybrid or all-electric automobile, storage of energy from photovoltaic cells).

More specifically, the active compounds of the electrodes used in commercial batteries are, for the positive electrode, lamellar compounds such as $LiCoO_2$, $LiNiO_2$ and mixed compounds $Li(Ni,Co,Mn,Al)O_2$ or compounds of spinal structure with a composition close to $LiMn_2O_4$. The negative electrode is generally carbon (graphite, coke, . . . ) or optionally the spinal $Li_4Ti_5O_{12}$ or a metal forming an alloy with lithium (Sn, Si, . . . ). The mentioned theoretical and practical specific capacities of the positive electrode compounds are about 275 mAh/g and 140 mAh/g for oxides of lamellar structure ($LiCoO_2$ and $LiNiO_2$) and 148 mAh/g and 120 mAh/g for the spinal $LiMn_2O_4$, respectively. In every case, an operating voltage relatively to the metal lithium close to 4 volts is obtained.

By the term of "theoretical specific capacity", is meant, in the sense of the invention, the specific capacity expressed in mAh/g calculated by the following theoretical formula: Number of moles of theoretically exchanged $Li^+$ ions between the positive electrode and the negative electrode (i.e. the number of $Li^+$ ions theoretically extracted reversibly from the active compound of the positive electrode) multiplied by one Faraday (96,500 C) divided by 3,600 seconds and divided by the molar mass of the compound in g/mol.

By the terms of "practical specific capacity", is meant, in the sense of the invention, the actual specific capacity measured in mAh per gram of the compound.

Since the emergence of lithium batteries, several generations of electrode materials have successively appeared [J.-M. Tarascon and M. Armand, *Nature,* 414 (2001) 359-367: Issues and challenges facing rechargeable lithium batteries]. The concept of inserting/extracting lithium into/from electrode materials has been extended a few years ago to three-dimensional structures built from polyanionic entities of the type $XO_n^{m-}$ (X=P, S, Mo, W . . . ), so that the materials with a structure of the olivine type for example have presently given rise to a real craze. As an example, patent FR2848205 claims the use of lithiated iron phosphate doped with boron as an active material of the positive electrode, such as $LiFe_{0.95}B_{0.033}PO_4$.

In order to respond to the new markets of the hybrid and electric automobile, and of photovoltaic solar energy, for example, the development of Li-ion batteries, generally based on the $LiCoO_2$/graphite pair (positive electrode/negative electrode), will have to be modified. The constraints on cost and on production level, on power performances and safety, impose abandoning inter alia the positive electrode active compound $LiCoO_2$ (and its derivatives) used up to now. In this perspective, iron and lithium phosphate or lithiated iron phosphate $LiFePO_4$ and its derivatives, with a structure of the olivine type, are presently essentially considered as an alternative to $LiCoO_2$ and to other conventional lamellar and spinal oxides as a positive electrode material for Li-ion batteries.

To this day, there exist many methods for making lithium iron phosphate $LiFePO_4$, such as for example the one described in document EP1261050. This document teaches a mixture of an aqueous iron(III) nitrate solution with a lithium phosphate in an equimolar amount. The mixture is then subject to evaporation in order to obtain a homogeneous mixture of precursors containing Li, Fe, and $PO_4$ in stoichiometric amounts of $LiFePO_4$. The iron(III) is then reduced into iron (II) during an annealing step optionally with milling. The compound $LiFePO_4$ is then formed by annealing, is in the form of particles, the sizes of which differ depending on the annealing temperature.

$LiFePO_4$ is subsequently mixed with acetylene black and the whole is milled in a laboratory ball milling machine in order to obtain particles of $LiFePO_4$ coated with carbon. The practical specific capacity of the obtained powder is 114 mAh/g, which remains very low for a charging/discharging rate of C/5.

Other methods for making this cathode material also exist. However today, none of these methods may be used for cost-efficient industrial production in order to produce a cathode material having electrochemical performances which may be used in the desired applications. Actually, either the manufacturing method cannot be industrially applicable, or the material obtained is not sufficiently performing and certainly not in applications with thick electrodes. Lithiated iron phosphates have already been used for a few years in certain commercial batteries for portable tools: In spite of their assets, these iron phosphates do not yet allow high energy densities to be attained. The announced performances indicate a 100 to 120 Wh/kg on the scale of the Li-ion cell (i.e. a battery in which the lithium ion of the cathode is reversibly exchanged between the cathode and the anode, via the use of an electrolyte comprising a lithium salt) (positive electrode based on $LiFePO_4$, and negative electrode based on carbon), versus 160 to 180 Wh/kg for a conventional cell (i.e. a single battery with lithium cobalt oxide/carbon).

Therefore, there exists a need for producing a composite electrode material in lithiated iron phosphate and carbon with which it is possible to attain a practical energy density greater than 140 Wh/kg at the Li-ion cell, from which thick electrodes may be shaped and this on an industrial scale unlike the manufacturing methods on a laboratory scale.

The present invention therefore relates to a method for producing a composite electrode material based on lithiated iron phosphate and carbon comprising the steps:

forming a mixture of precursors containing at least lithium phosphate, iron(II) phosphate and a material containing carbon, under an inert atmosphere, milling said obtained mixture of precursors and calcining said milled mixture during which pyrolysis of the material containing carbon and formation of lithiated iron phosphate crystals occur.

A manufacturing method of the same type is for example known from document EP 1 195 827. This document teaches addition of carbon, for example carbon black or graphite at any step before calcination and a compression step is carried out between the milling and the calcination.

Further, this document teaches a milling time of about 10 hours, depending on the different manufactured cathode materials. However, with such a milling time, it is not possible to produce the electrode material industrially, but at the very most it may be made on a laboratory scale, in particular with view of the present economic situation which tends to reduce energy consumptions and pollutant emissions. Therefore, there exists a need for developing a method for producing an electrode material which is less energy-consuming and therefore industrially applicable while giving the possibility of attaining satisfactory electrochemical performances, such as that of a composite electrode material based on lithiated iron phosphate and carbon with which it is possible to attain a practical energy density of more than 140 Wh/kg at the Li-ion cell.

Another document which discloses the aforementioned steps is document WO2009/117871. This document discloses a step for sintering precursors based on lithium, iron, phosphate and carbon and then mixing a material containing carbon with the first product from the sintering. Subsequently, a second sintering step at a second temperature is carried out on the mixture in order to obtain the desired material. In this way, the carbon which may act as a reducing agent during the first sintering is uniformly distributed among the chemical precursors before the first sintering. The second addition of carbon gives the possibility of ensuring coating of the surface with the thereby formed lithiated iron phosphate crystals. This carbonaceous coating provides a conducting surface and contributes to limiting the size of the lithiated iron phosphate crystals and promotes the desired homogeneity in the size of the crystal. This document further teaches, between the sintering steps, the preferable carrying out of a milling step and gives a host of different possible milling operations ranging from hand milling to ball milling and at speeds of rotation as diverse as 30 to 400 rpm. In the examples, a step for milling the precursors is carried out in which a conventional ball milling machine is used for about 10-12 hours in order to obtain a particle size comprised between 1 and 3 μm.

This type of milling time is, as mentioned above, not adequate for manufacturing at an industrial scale a cathode material having an energy density of more than 140 Wh/kg, and this also when thick electrodes are produced.

Another document is document EP1193783 which produces a lithiated iron phosphate having a particle size of less than 3.1 μm with the purpose of obtaining a BET specific surface area which is greater than 10.3 m$^2$/g. According to the teaching of this document, this allows an improvement in the contact surface area between the cathode material produced and the electrically conducting material in order to improve the electron conductivity of the actual cathode material. Unfortunately, according to this document, manufacturing of lithiated iron phosphate is carried out on a laboratory scale and the product was only tested in button cells.

Therefore there still exists a need for being able to produce lithiated iron phosphate on an industrial scale and which may provide an energy density of more than 140 Wh/kg, even in the form of thick electrodes.

In order to solve this problem and therefore obtain a composite electrode material of lithiated iron phosphate and carbon with which an energy density of more than 140 Wh/kg may be obtained, which may be manufactured industrially, i.e. with which the production method allows a certain cost efficiency and which is preferably continuous, it is necessary to optimize the method for producing the composite material in order to be then able to optimize the steps for manufacturing the electrodes and the electrochemical cells.

At the end of the production method, it is appropriate to obtain an electrode composite material, the physico-chemical characteristics of which will allow shaping of the electrodes, in particular thick electrodes.

Indeed, as mentioned above, in addition to being sufficiently cost effective and therefore industrially feasible, the method according to the invention should give the possibility of making thick electrodes having a high surface capacity (in mAh/cm$^2$). As an example, a surface capacity comprised between 0.5 and 1 mAh/cm$^2$ may be inferred from the examples described in patent EP 1 195 827, which is insufficient for producing from this electrode composite material, Li-ion cells with high energy density. The latter then dictates the intrinsic performances of the battery; in particular the energy density. Unlike LiCoO$_2$, the compound LiFePO$_4$ is, for example, generally not suitable for making such electrodes.

By the terms of lithiated iron phosphate or LiFePO$_4$ is generally meant any compound based on lithiated iron phosphate, either alone or as a mixture, or further partly substituted like doped lithiated iron phosphates. An example in the sense of the invention of such a doped lithiated iron phosphate is lithiated iron phosphate doped with boron.

Therefore, there exists a need for obtaining a composite electrode material with which thick electrodes may be made, having a high surface capacity, in order to provide the electrochemical cell with a high practical energy density and the manufacturing method of which is industrially feasible.

For this purpose, the method according to the invention is characterized in that said milling is an industrial high energy ball nano-milling for a predetermined time sufficient for giving sufficient mechanical activation energy to the mixture of precursors in order to obtain micrometric mixed aggregates of nanometric particles.

By the terms of "high energy ball nano-milling", "mechanosynthesis", "mechanochemical activation or synthesis", "nano-milling", "nanosaturation" or further "mechanical alloying", which may be used in the present description interchangeably, is meant any method in which agitation of the milling medium (generally balls) produces impacts not only leading to mechanical fracturing of the powder grains at a nanometric scale (obtaining nanometric particles) but also to their rebinding at an atomic scale by a mechanism of microforging or diffusion welding (formation of micrometric mixed aggregates of nanometric particles). Nano-milling according to the invention therefore has to be performing so that it is really high energy nano-milling, i.e. free of clogging so that the nano-milling transmits the energy given to the balls, to the material to be milled and not that the impacts be inefficient because of clogging.

Further, according to the invention, nano-milling is an industrial nano-milling step, i.e. with which the cathode material according to the invention may be produced on an industrial scale, in a cost-efficient way, i.e. giving the possibility of producing a material throughput of more than 1 kg/h, and preferably of at least 3 kg/h, or even at least 5 kg/h, or even at least 10 kg/h and most preferentially of at least 15 kg/h.

During high energy ball milling, milling therefore gives the powder a large energy per unit time, which may be estimated at more than 125 kJ/h, preferably more than 150 kJ/h, more preferentially more than 175 kJ/h, more particularly about 200 kJ/h, per kg of powder to be milled in order to achieve formation of micrometric mixed aggregates of nanometric particles generally in less than two hours while maintaining a specific capacity of the material of more than 150 mAh/g at the end of the process.

The average milling time for the mixture of precursors according to the invention therefore depends on the relative velocity of the balls and on the amount of material. In the absence of clogging, if a maximum relative velocity of the balls of 8 m/s is considered, about 30 minutes of milling will have to be reckoned with, a maximum relative velocity close to 6 m/s will require a milling time of about 45 minutes while a relative velocity of the balls of about 11 m/s to 14 m/s will only require a milling time from 10 to 20 minutes. The milling times mentioned here are only the times given for obtaining mechano-chemical activation beyond which the energy proportion consumed by the milling does not provide any additional characteristic to the milled product.

Of course, nothing prevents extension of the milling for a longer time beyond the values mentioned above, if the energy optimum is not crucial. In certain cases, a relative velocity of the balls comprised between 2 and 3 m/s for a duration of 2 to 4 hours also proved to be an acceptable compromise for the energy consumption of this nano-milling step, provided that the energy provided per unit time to the material to be milled is sufficient so that the milling may be described as high energy milling and for thereby giving the powder sufficient energy for splitting it up into nanoparticles and reuniting it into micrometric aggregates.

The time sufficient for obtaining the desired milled condition, i.e. micrometric mixed aggregates of nanometric particles, will therefore be called in the sense of the invention "predetermined milling time sufficient for giving the mixture of precursors sufficient mechanical activation energy in order to obtain micrometric mixed aggregates of nanometric particles". This predetermined time therefore depends on the type of milling machine (maximum velocity of the balls, geometry of the milling machine, efficiency of energy transfer to the material, milling medium used, etc). In any case, the milling time will generally be comprised between 5 minutes and 5 hours depending on the milling machines used.

High energy industrial nano-milling according to the invention is therefore advantageously carried out in a high energy milling machine selected from the group of ball milling machines ATR or PULVIS, mechano-fusion milling machines NOBILTA or AMS, marketed by Hosokawa Alpine, the milling machine Attritor marketed by Union Process, the milling machine LME or LMZ marketed by Netzsch and, the milling machine Simoloyer® marketed by Zoz GmbH.

By the term of "relative velocity of the balls" is meant in the sense of the invention, the linear velocity of the balls relatively to a reference system bound to the milling enclosure, the latter may be fixed or moving depending on the type of milling machine.

By the term of "micrometric mixed aggregates of nanometric particles" is meant in the sense of the invention aggregates for which the average size (D50) measured by laser grain size measurement in methanol is comprised between 0.5 to 60 μm, preferably between 1 and 45 μm and more preferentially from 2 to 15 μm, the chemical composition of which on the scale of the aggregate is identical from one aggregate to the other, and consisting of a welded assembly of particles of nanometric sizes from the whole of the powders of the precursor mixture to be milled when the terms are used for describing the morphology of the product before the calcination step, or consisting of a welded assembly of particles of nanometric sizes of the electrode composite material when the terms are used for describing the morphology of the product after the calcination step.

By the term of "nanometric particle", is meant in the sense of the invention, particles for which the maximum size measured by transmission microscopy is less than 50 nm.

Such milling is for example obtained by a device described in patent U.S. Pat. No. 5,464,163. In this way, the milling gives a milling energy due to the collisions of the particles and gives the possibility of obtaining finer nanometric particles and essentially more rapidly than in conventional milling steps. These collisions also allow the nanoparticles to be reunited together so as to form aggregates, the size of which depends on the statistical equilibrium between the occurrence frequency of "splitting-up" impacts and that of "reuniting" impacts.

In this way, the aggregates are particularly optimal milled powder arrangements in order to obtain a preliminary shape which will allow in a subsequent step manufacturing of thicker electrodes than those of the state of the art. In this way, since both factors (tapped powder density and thickness) attain optimum values, the surface area capacity which depends linearly on their product is necessarily also optimum and in any case greatly superior to those described in various publications on the subject.

Indeed, the surface area capacity (which is the result of the product of the specific capacity in mAh/g by the packed density in $g/cm^3$ and the thickness of the electrode in cm) is considered satisfactory when the packed in density in $g/cm^3$ and the electrode thickness both reach optima. The surface capacity will be considered as satisfactory when it is greater than 2 $mAh/cm^2$, preferably greater than 3 $mAh/cm^2$.

These aggregated micrometric grains of nanometric particles therefore give the possibility of obtaining higher densities in the composite material according to the invention which therefore allows better performances to be attained both at the electrode and at the cell and are further produced by a much less energy-consuming process, which requires reduced milling times (for example 10 hours to less than 4 hours, preferably less than 2 hours) since the energy efficiency for a milling machine allowing nano-milling is greater than that of conventional milling machines which do not allow nano-milling under normal conditions of use (reasonable milling times, energy consumption).

The energy efficiency of the nano-milling step may depend on the geometry of the milling machine, on the size of the balls, on the material of the balls, on the milling medium, on the maximum relative velocity of the milling medium, . . . For example, if the parameter "maximum relative velocity of the milling medium" is taken into account, it is advantageous if this high "relative velocity" notably allows generation of impacts of sufficient energy in order to avoid formation by the powder of deposits (clogging) on the elements of the milling medium (walls of the milling enclosure, balls and if necessary stirring arms or blades). The formation of such deposits considerably reduces the efficiency of the milling for the following reasons:

- as the amount of free powder decreases, the number of ball/ball or ball/wall impacts without powder grains increases, which increases the proportion of heat dissipation generated by the impacts.
- the powders trapped in such deposits receive less mechanical energy than the powders remaining free since the deposits may dissipate part of the impact energy, (by damping or transmission to the substrates).
- the powders trapped in such deposits may be difficult to recover and generally require manual intervention, which considerably reduces the effective time of use of the milling machine or by default limits the amount of recovered powder.

If the nano-milling step is combined with other techniques allowing removal of the clogging of the milling machine, in this case, for example, the use of high energy nano-milling machines at lower maximum relative velocities of the milling medium such as from 2 to 4 m/s, is conceivable according to the invention, provided that the energy transmitted to the powder during the milling step is sufficient for providing splitting-up impacts and reuniting impacts, in order to obtain micrometric mixed aggregates of nanometric particles of the cathode material, all this in a milling time which may be utilized industrially.

In a preferential embodiment of the method according to the invention, said milling step is carried out for less than half an hour and preferably for about 15 minutes, which allows further improvement in the environmental and energy-consuming impact of the method according to the invention.

In certain embodiments according to the invention, the micrometric grains of nanometric particles have an average size (D50) measured by laser grain size measurement in methanol comprised between 30 and 60 µm. In this case, after calcination of the product, an additional step for conventional milling is carried out so as to break up the agglomerates of micrometric grains of nanometric particles. These agglomerates do not form a material which is difficult to mill, simple milling such as impact milling coupled with classification is sufficient.

Advantageously, said calcination step has a duration of less than 2 hours, preferably less than 1 hour and more preferentially less than half an hour.

From this it emerges that in addition to allowing a substantially shortened milling step, which is more cost efficient from an energy yield point of view, the effect obtained on the fineness of the grains of the electrode material before calcination also allows drastic reduction in the duration of the calcination step resulting in this way in a complete even less contaminating and even less energy-consuming manufacturing method. For all practical purposes, let us recall that a number of calcination methods have durations substantially equal to a time period comprised between 5 and 10 hours.

In a preferential embodiment of the method according to the invention, said mixture of precursors also contains a boron source such as boron phosphate, boron carbide or mixture thereof and said composite material of lithiated iron phosphate and of carbon is a composite material of boron-doped lithiated iron phosphate and of carbon.

In this case, the formula of the obtained product is preferably $LiFe_\beta B_\gamma PO_4/C$ with $0<\gamma/\beta\leq0.1$ and $\gamma+\beta<1$.

The boron is then inserted into the crystalline structure of $LiFePO_4$ with substitution of one portion of the iron atoms, consequently generating a few cationic voids within the material ($\gamma+\beta<1$). This structural modification of $LiFePO_4$ would lead to remarkable improvement in the electric conductivity of the material.

In an advantageous embodiment according to the invention, the method comprises before formation of said mixture of precursors, a step for synthesizing lithium phosphate by neutralization of lithium hydroxide with phosphoric acid, in an aqueous medium and at room temperature, according to the reaction (I).

$$3LiOH.H_2O+H_3PO_4 \rightarrow Li_3PO_4+6H_2O \quad (I)$$

For example, and preferably, lithium hydroxide is obtained by dissolving lithium hydroxide in water, while phosphoric acid is gradually added, at a controlled rate and with stirring. The thereby obtained lithium phosphate is then decanted, filtered, washed and subsequently dried.

As an example, in the method according to the invention, said iron(II) phosphate is synthesized at room temperature by reaction in an aqueous medium of iron(II) sulfate with DSP (disodium phosphate), according to the reaction (II).

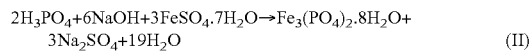

$$2H_3PO_4+6NaOH+3FeSO_4.7H_2O \rightarrow Fe_3(PO_4)_2.8H_2O+\\3Na_2SO_4+19H_2O \quad (II)$$

As this may be seen, the disodium phosphate is for example prepared in situ by partial neutralization of phosphoric acid by the suitable amount of caustic soda and an iron(II) sulfate aqueous solution is added at a controlled rate and with stirring. Preferably the pH is continuously adjusted by adding caustic soda. In an alternative according to the invention, caustic soda is replaced with another conventional base. More preferentially, the reaction medium is maintained with stirring after adding the reagents. The thereby obtained iron(II) phosphate precipitate is decanted, filtered, washed and dried in vacuo and the temperature of the product is maintained below 60° C.

In a particularly advantageous way, the method according to the invention comprises degassing of the water by argon sparging and inertization of the equipment used in order to avoid oxidation of iron(II) into iron(III). For example, the reaction tanks, the drying filter for drying the formed precipitate are also placed under an inert atmosphere with argon or optionally nitrogen, or further optionally with carbon dioxide.

Preferentially, milling is also carried out in an inert atmosphere (argon, $CO_2$ or nitrogen) or under static vacuum (less than 0.1 mbars) in order to retain the iron phosphate in an in-majority reduced state (% Fe(II)>% Fe(III)) by limiting its oxidation which is promoted by the heat generated during the milling operation (thermal dissipation of the impacts, re-absorption of the evaporated water from the precursors, ...) by the presence of steam from the evaporation of the water contained in the precursors. By retaining the iron phosphate in an in-majority reduced state at the end of the milling, it is possible to limit the amount of carbon precursor which will be consumed as a reducing agent during calcination and to therefore limit the amount of carbon precursor to be added to the mixture to be milled, and avoid in the case of an insufficient amount of carbon precursor, obtaining impure compounds in the final composite material, which would have negative consequences on the electrochemical performances of the composite material.

Advantageously, in the method according to the invention, calcination is carried out under an inert argon atmosphere in order to avoid as much as possible oxidation of the iron(II) phosphate at the beginning of the calcination and to give the possibility of obtaining reducing conditions during thermal decomposition of the carbon precursor (by evolvement of CO and $H_2$). Calcination takes place advantageously at a temperature comprised between 550° C. and 800° C. and advantageously of about 600° C. for 10 to 20 minutes and preferably for 15 minutes. In any case, the calcination temperature should be less than the melting temperature of one of the precursors.

Preferentially, said material containing carbon is cellulose, with which it is possible, because of the nature of the carbon source added during the synthesis, to limit the crystalline growth of the grains of $LiFe_\beta B_\gamma PO_4$ and provide some porosity to the material. Indeed, the decomposition of the cellulose during the calcination step, preferably very short, allows the carbon to be distributed very homogeneously in the thereby obtained composite electrode material and improves in thisway the conductivity and therefore the electrochemical performances of the composite electrode material according to the invention.

Other embodiments of the method according to the invention are mentioned in the appended claims.

The present invention also relates to an electrode material having the following formula $Li_\alpha Fe_\beta B_\gamma PO_4/C$ wherein $0.85 \le \alpha \le 1.08$, $0 \le \gamma/\beta \le 0.1$ and $\gamma+\beta \le 1$. This electrode material is characterized in that it appears as micrometric mixed aggregates of nanometric particles, said nanometric particles having a maximum size as measured by transmission microscopy of less than 50 nm and said micrometric mixed aggregates having an average size (D50) measured by laser grain size measurement in methanol comprised between 0.5 and 60 μm, preferably between 1 and 45 μm and more preferentially from 2 to 15 μm, more preferentially from 3 to 8 μm.

This characteristic of the electrode material according to the invention, for example obtained by the method as mentioned above, gives the possibility of obtaining electrodes which may in particular be utilized industrially since they may be produced in a cost-efficient way. Further, it allows the formation of thick or thin electrodes which have optimum physico-chemical characteristics in particular a practical specific capacity, this material being destined to a bright future. More particularly, the electrode material according to the invention therefore gives the possibility of providing a practical electrode specific capacity comprised between 150 and 170 mAh/g, preferably between 155 and 170 mAh/g and generally comprised between 155 and 165 mAh/g, for a surface capacity of less than 2 mAh/cm$^2$ and of providing a practical electrode specific capacity of more than 150 mAh/g for a surface capacity comprised between 2 and 4 mAh/cm$^2$.

With the present invention, it was therefore possible to obtain from a finally industrially applicable manufacturing method, a composite electrode material which may provide to the electrode formed from the latter, a high surface capacity, by the morphology obtained by high energy milling, in particular by forming micrometric aggregates of nanometric particles. Indeed, as mentioned earlier, in order to obtain a high surface capacity for an electrode, the latter being proportional to the thickness of the electrode, it is important that this value should tend to a maximum which is the case with the advantageous milling according to the invention which further is less energy-consuming than conventional milling methods.

Indeed, it was surprisingly discovered that the milling step according to the invention, of particularly short duration (combined with the calcination step optionally also of very short duration) gives the possibility of obtaining, by the micrometric structure of the mixed aggregates of nanometric particles, a high practical specific capacity while giving the possibility of obtaining a reduced production cost and a not very contaminating and not very energy-consuming production method.

Advantageously, the electrode material according to the invention has the following formula $LiFe_\beta B_\gamma PO_4/C$ wherein $\gamma+\beta<1$, in particular $LiFe_{0.95}B_{0.033}PO_4/C$. In this way, the boron is inserted into the crystalline structure of $LiFePO_4$ by substitution of a portion of the iron atoms, consequently generating a few cationic voids within the material ($\gamma+\beta<1$). This structural modification of $LiFePO_4$ would lead to remarkable improvement in the electric conductivity of the material.

The electrode material according to the invention has an XRD density of about 3.6 g/cm$^3$ and a density measured by helium pycnometry of about 3.4 g/cm$^3$.

In an advantageous embodiment of the electrode material according to the invention, the residual carbon content is strictly comprised between 1% and 3% by weight based on the total weight of the electrode material.

With the present invention, it was therefore further possible to obtain an electrode material having reduced carbon content while obtaining particularly advantageous electrochemical performances, similar to those obtained for example in the prior art with higher carbon contents, inter alia, because of the use of a reduced calcination time which necessarily requires use of carbon as a lesser inhibitor of crystalline growth.

Indeed, carbon is used for two purposes in a calcination. First of all, it is used as an inhibitor of crystalline growth and next it allows improvement in the specific capacity of the electrode material. By reducing the calcination time advantageously obtained in accordance with the method according to the invention, the carbon content required for obtaining the sought specific capacity is also reduced and it is therefore possible to obtain a larger amount of active material as compared with the methods where the carbon content is higher. Consequently, without reducing the active material content, electron conduction is improved.

Further, by the reduced carbon content of 1% to 3% by weight, based on the total weight of the electrode material, the grains with the crystalline structure $LiFe_\beta B_\gamma PO_4$ are coated discontinuously with carbon and a portion of the carbon may also be dispersed within the main powder.

The electrode material according to the invention in the final state (after milling and calcination) has a tapped density from 0.8 to 1.5 g/cm$^3$ and preferably about 1.1 g/cm$^3$.

By the term of "tapped density", in the sense of the present invention, is meant the apparent density of a powder measured according to the ASTM B527 and D4164 standards.

Advantageously, the electrode material according to the invention has a specific surface area measured according to the BET method which has a value from 12 to 24 m$^2$/g, preferably from 16 to 22 m$^2$/g, in particular from 18 to 20 m$^2$/g.

Preferably, the electrode material according to the invention has an average size (D50) of aggregates measured by laser grain size measurement in methanol comprised between 3 and 8 μm.

Other embodiments of the electrode material are described in the appended claims.

The invention also relates to an electrode in a composite material of lithiated iron phosphate and of carbon having, at a surface capacity of less than 2 mAh/cm$^2$, a practical specific capacity of more than 150 mAh/g, preferably more than 155 mAh/g and less than 170 mAh/g.

The invention also relates to an electrode in a composite material of lithiated iron phosphate and of carbon having, at a surface capacity comprised between 2 and 4 mAh/cm$^2$, and preferably of the order of 3 mAh/cm$^2$, a practical specific capacity of more than a 150 mAh/g and of less than 170 mAh/g.

As this may be seen, the electrode has a particularly high surface capacity, whether this be in a thin electrode (having a surface capacity of less than 2 mAh/cm$^2$) or in a thick electrode (having a surface capacity comprised between 2 and 4 mAh/cm$^2$), in particular because of the high density of the composite powder obtained at the end of the milling and micrometric mixed aggregates of nanometric particles, also obtained at the end of the milling with which high electrode thicknesses may be attained. As a consequence of this, since the specific capacity is a function of the product of the density of the powder and of the thickness of the electrodes, it is clearly obvious that by obtaining maximum values for both of these quantities, it is possible to obtain an optimal specific surface capacity for the electrode according to the invention.

In another embodiment, the electrode further comprises one or several electron conducting additives and one or several organic binders.

Advantageously, said one or several electron conducting additives is selected from the group formed by carbon fibers, carbon black, carbon nanotubes or the like.

Preferably, said electrode material is present in an amount ranging from 80% to 92% by weight based on the total weight of the electrode.

Advantageously, said one or several electron conducting additives is present in an amount ranging from 4% to 14% by weight based on the total weight of the electrode, so as to ensure a compromise between conductivity (in order to ensure electron percolation) and density of the electrode: the presence of carbon reduces density, but promotes the obtaining of a good practical capacity via improvements in the conductivity. In a preferential embodiment, said one or several organic binders is present in an amount ranging from 4% to 10% by weight based on the total weight of the electrode.

Preferentially, the porosity of the electrode is comprised between 15% and 25%.

Other embodiments of the electrode according to the invention are mentioned in the appended claims.

The present invention also relates to an Li-ion electrochemical cell comprising an electrode according to the invention as well as optionally a negative carbon electrode and an Li$^+$ ion conducting electrolyte.

The electrochemical cell according to the invention further advantageously has an energy density comprised between 160 to 180 Wh/kg.

Other embodiments of the electrochemical cell according to the invention are indicated in the appended claims.

Other features, details and advantages of the invention will become apparent from the description given hereafter, not as a limitation and with reference to the appended drawings and examples.

FIG. 1 is a graph illustrating an X-ray diffraction diagram ($\lambda_{CuK\alpha}$) of a LiFe$_{0.95}$B$_{0.033}$PO$_4$/C powder containing 2.5% by weight of carbon according to the invention (A). The vertical symbols (B) correspond to the Bragg positions calculated for the Pnma space group and for the lattice parameters a=10.326 (3) Å, b=6.006 (2) Å and c=4.695 (2) Å. The curves (D) and (C) respectively correspond to the simulated diagrams and to the difference between the experimental and simulated diagrams.

FIG. 2 is a graph illustrating the size distribution of the grains of a LiFe$_{0.95}$B$_{0.033}$PO$_4$/C powder containing 2.5% by weight of carbon according to the invention. The grain size analysis was carried out by laser diffraction. The curve (A) represents the volume fraction for each relevant grain size interval. The curve (B) represents the accumulated volume fraction, and is read from left to right.

FIG. 3 illustrates a micrograph of a LiFe$_{0.95}$B$_{0.033}$PO$_4$/C powder containing 2.5% by weight of carbon according to the invention obtained by scanning electron microscopy (SEM) in the back-scattered electron mode.

FIG. 4 is a graph illustrating a charging/discharging curve in a galvanostatic mode (discharge condition C/5; 20° C.) of a LiFe$_{0.95}$B$_{0.033}$PO$_4$/C powder containing 2.5% by weight of carbon according to the invention. The theoretical capacity of the LiFePO$_4$/FePO$_4$ pair is 170 mAh/g. The carbon present in the LiFePO$_4$/C composite lowers this value by a few milliampere-hours per gram.

In these figures, identical or similar elements bear the same references.

Figure 1:
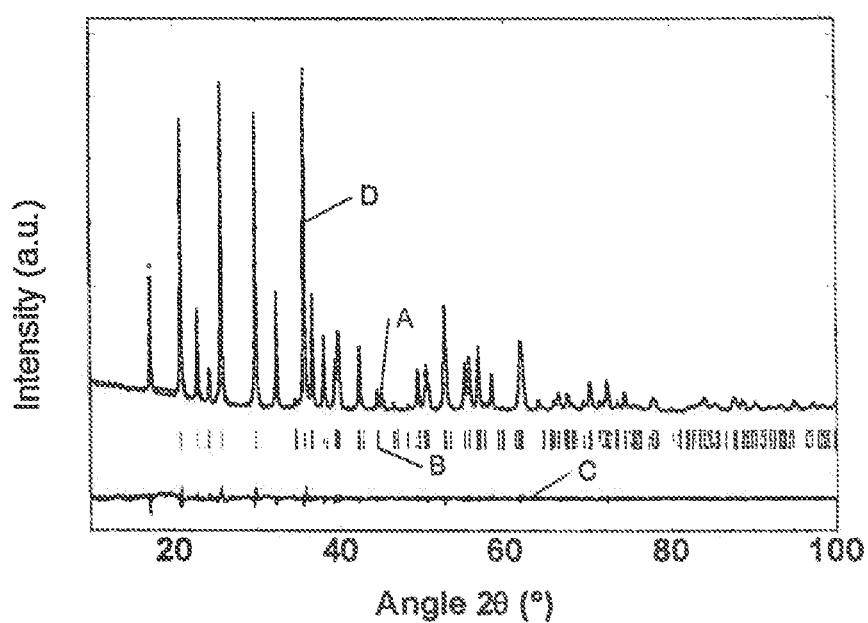

As mentioned earlier, the present invention deals with a method for synthesizing an optimized LiFePO$_4$/C composite allowing elaboration of thick electrodes, and then with the manufacturing of Li-ion batteries with an energy density of more than 140 Wh/kg (140-180 Wh/kg).

Three major steps are provided for obtaining the LiFePO$_4$/C composite electrode material powder. This powder contains at least 96% by mass of LiFePO$_4$ and less than 3% by mass of carbon. The carbon is preferably derived from the thermal decomposition of cellulose. The three major steps leading to the LiFePO$_4$/C composite are:

1. synthesis in an aqueous solution of the precursor Fe$_3$(PO$_4$)$_2$,nH$_2$O(n~8), 2. mechanochemical activation (nano-milling or nano-structuration) allowing homogeneous mixing of the precursor Fe$_3$(PO$_4$)$_2$,nH$_2$O (n~8) with Li$_3$PO$_4$ and cellulose, by a high energy ball milling machine for a sufficient time so as to provide the mixture of precursors with sufficient mechanical activation energy so as to obtain micrometric mixed aggregates of nanometric particles, for example.

3. rapid heat treatment under a controlled (inert) atmosphere.

The theoretical capacity of lithiated iron phosphate LiFePO$_4$ is 170 mAh/g. The operating potential of the LiFePO$_4$/FePO$_4$ system (3.45 V versus Li$^+$/Li) and the specific gravity (3.5 kg/L) are lower than for LiCoO$_2$/Li$_{0.45}$CoO$_2$ (~4.0 V versus Li$^+$/Li and 5.0 kg/L). On the other hand, iron phosphate has a very low intrinsic cost, a very long cycling lifetime (i.e. the number of charging and discharging cycles without any significant loss, while being aware that at least 20% of the initial capacity is often retained as being a significant capacity loss value) and a safety component clearly greater than that of lamellar oxides, particularly in the charged state (great thermal and chemical reactivity of Li$_x$CoO$_2$; 0≤x≤1). The method for synthesizing the LiFePO$_4$/C electrode composite material according to the present invention involves several successive steps including a particularly not very energy-consuming mechanochemical activation step as compared with conventional milling/mechanochemical activation steps. This synthesis route, optimized at different (laboratory, prototyping, pre-industrial) scales, allows preparation of the LiFePO$_4$/C composite suitable for making thick electrodes and Li-ion cells with a great mass energy density (140 to 180 Wh/kg) by providing a composite electrode material having high density due to the fineness of the nanometric grain and the formation of micrometric aggregates at the end of the milling.

The first step of the synthesis consists of preparing an iron(II) precursor according to the following reaction (or a similar reaction using other reagents):

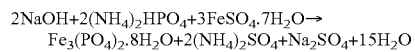

This synthetic iron(II) phosphate, of composition Fe$_3$(PO$_4$)$_2$.8H$_2$O is similar to the vivianite mineral. It is obtained by precipitation from an aqueous solution according to a reaction with stoichiometry between the $Fe^{2+}$ ions and the $PO_4^{3-}$ species (exemplary embodiment 1).

The second step of the synthesis involves milling of the thereby prepared iron precursor, from a lithium source, and optionally from a boron and carbon source, according to the following general reaction:

$$\beta \cdot Fe_3(PO_4)_2 \cdot 8H_2O + 3 \cdot \gamma \cdot BPO_4 + Li_3PO_4 + \text{cellulose} \rightarrow \text{"homogenous mixture of the reagents"}$$

wherein $0 \leq \gamma/\beta \leq 0.1$ and $\gamma + \beta \leq 1$.

This second step consists in mechanochemical activation of the different precursors, which will form after heat treatment, the desired $LiFePO_4$/carbon composite (exemplary embodiment 2).

The third step consists of carrying out a rapid heat treatment (of the order of 15 to 30 minutes) of the precursors under an inert atmosphere (argon) in order to form the $LiFePO_4/C$ composite. The temperature is generally comprised between 550 and 650° C. The overall reaction set into play is the following:

$$Fe_3(PO_4)_2 \cdot 8H_2O + Li_3PO_4 + \text{cellulose} \rightarrow 3LiFePO_4/C$$
(~97/3 by mass)+water+aldehydes+other degradation products of cellulose.

Subsequent to obtaining the desired powder, electrodes based on $LiFePO_4$ may be made. Their elaboration applies said powder, one or several electron conducting additives (carbon fibers, carbon black, . . . ) and an organic binder. The respective proportions are generally of the order of 80% to 92%, 4% to 14%, and 4% to 10% by mass. The base weight (or surface capacity) of the electrode varies depending on the application, from 2 to 4 $mAh/cm^2$ and its porosity is comprised between 50% and 25%.

The association of such an electrode with a negative carbon electrode and an $Li^+$ ion conducting electrolyte gives the possibility of making any type of Li-ion cell of a desired format (button cell, prismatic cell, cylindrical cell, . . . ) and desired capacity (from a few milliampere-hours to several tens of milliampere-hours). The energy density of the thereby assembled cells may attain 160 to 180 Wh/kg.

EXAMPLES

Example 1

Formation of Iron(II) Phosphate

Two liters of deionized water are placed with magnetic stirring in a beaker at room temperature. The oxygen of the water is removed by argon bubbling through a frit. This bubbling starts at least 15 minutes before introducing the reagents, and is maintained throughout the synthesis.

Next, 20.1 g of sodium hydroxide (NaOH) are dissolved in these 2L of water. When dissolution is complete, 66.84 g of diammonium hydrogen phosphate $((NH_4)_2HPO_4)$ are added and dissolved in the reaction medium. The pH is then about 11.

211.14 g of finely divided iron(II) sulfate $(FeSO_4 \cdot 7H_2O)$ are gradually added to the preceding solution, while maintaining stirring. A pale grey precipitate begins to form. Once the addition of iron sulfate is completed, the medium is maintained with stirring and with argon bubbling for 16 h.

Bubbling and stirring are then stopped in order to let the precipitate settle at the bottom of beaker. The liquid phase is removed. The precipitate is then washed with distilled water and centrifuged: the slurry containing the precipitate is introduced into 100 mL glass tubes and centrifuged in order to properly separate the precipitate from the liquid phase (50-80 mL of deionized and deoxygenated water are introduced beforehand in each tube, and then placed with stirring). The operation is repeated at least twice more. The precipitate is rinsed a last time, with acetone. Finally, the precipitate is dried in a dynamic vacuum (Büchi . . . ): in a first phase, vacuum is applied at room temperature for one h, and then heating to 60° C. is performed for 16 h while maintaining the vacuum. The obtained product has the composition $Fe_3(PO_4)_2 \cdot nH_2O (N \sim 8)$. It has a blue color.

Example 2

Formation of Said Composite Electrode Material Doped with Boron According to the Invention 35 g of $Fe_3(PO_4)_2 \cdot 8H_2O$, 8.42 g of lithium phosphate $Li_3PO_4$, 0.73 g of boron phosphate $BPO_4$ and 3.45 g of cellulose are introduced into a milling bowl in tungsten carbide ((W—Co)C) of 250 mm, with 14 tungsten carbide balls (diameter of 20 mm). The bowl is entered into a glove box under argon ($O_2$ content<2 ppm, $H_2O$<10 ppm). It is closed (lid sealed with adhesive tape) so that the atmosphere in the interior is free of oxygen during milling. On the outside of the glove box, the bowl is placed on a high energy laboratory milling machine (planetary milling machine "Pulverisette 4", available from Fritsch GmbH). Milling is started, the speed of rotation is +400/-400 revolutions per minute with the purpose of performing energetic milling. The actual duration of the milling is 1 h, carried out in four cycles of 15 mins spaced out by a pause of 5 mins for limiting the heating up of the bowls, the air cooling of which is insufficient for milling without any interruption. The bowl is then again introduced into a glove box. The milled powder is recovered. The synthesis precursors are now activated (nanostructured intimate mixture). The powder may be stored in argon while waiting to be heat treated.

Figure 2:
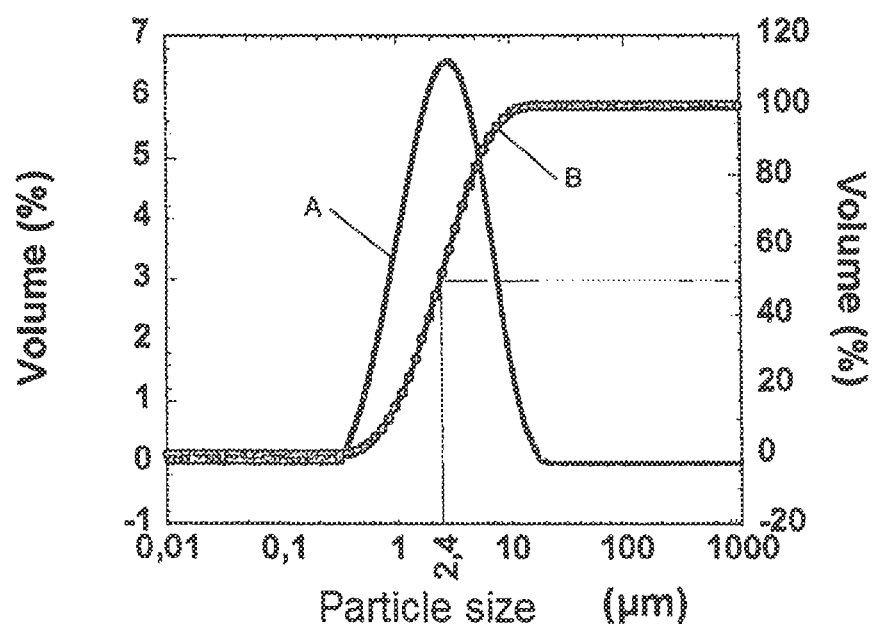

In order to carry out the heat treatment of calcination or pyrolysis, 2 g of the powder mechanochemically activated by the milling are introduced into a gold boat, which is placed in a sealed quartz tube (in a volume of 440 mm—outer diameter of 30 mm, length of 500 mm). Outside the glove box, the quartz tube is introduced for 15 mins in an oven already preheated to 600° C. The tube is then taken out of the oven (~air quenching). Thus, the powder very rapidly attains the synthesis temperature and only remains there for a short instant. Once it has cooled, the powder is recovered in air and stored after reconditioning under argon. The composite $LiFe_{0.95}B_{0.033}PO_4/C$ is formed. It contains less than 3% by weight of carbon based on the total weight of the composite electrode material. As this may be seen in FIG. 1, the $LiFe_{0.95}B_{0.033}PO_4/C$ phase is perfectly crystallized. The average size of the aggregates is 2.4 mm, as this may be seen in FIG. 2.

Figure 3:
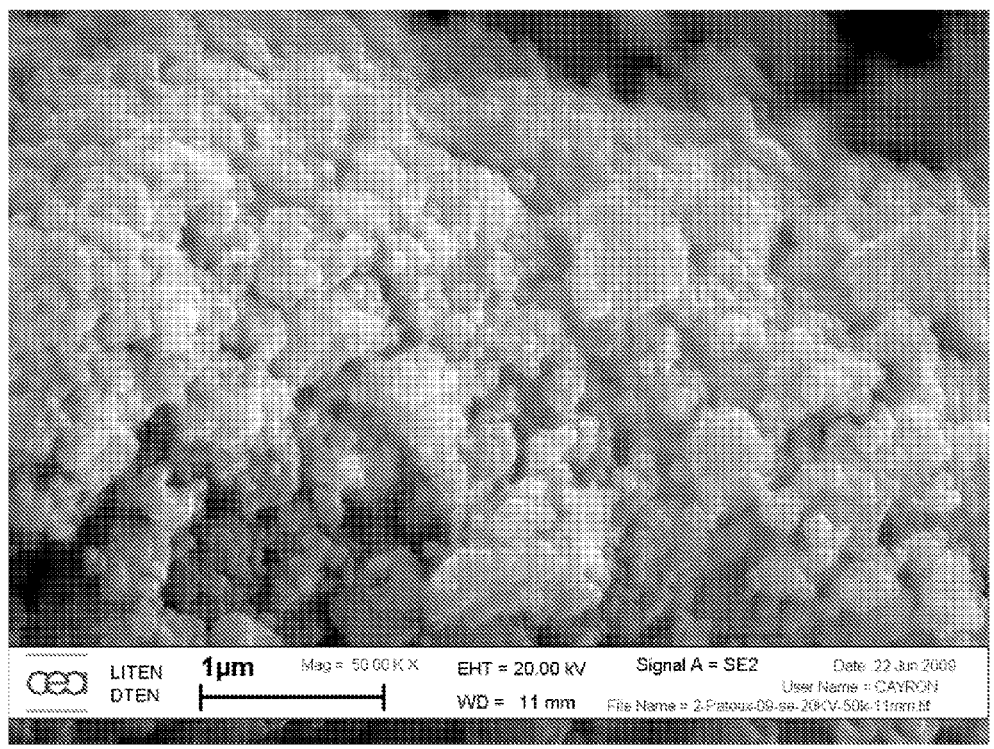

As this may be seen in FIG. 3, these aggregates consist of a compact micrometric assembly of nanoparticles.

It is this strong compactness which gives the possibility of attaining the required density for subsequent formation of the electrode.

Example 3

Formation of a Metal Lithium Battery

A metal lithium battery of the "button cell" type is built with
- a negative electrode (anode) of lithium (diameter 16 mm, thickness 130 μm) deposited on a nickel disc used as a current collector, a positive electrode (cathode) consisting of a disc with a diameter of 14 mm taken on a composite film with a thickness of 25 µm comprising the material of the invention prepared according to example 2 (80% by mass), of carbon black (10% by mass) as a conducting material and polyvinylidene hexafluoride (10% by mass) as a binder, the whole being deposited on a current collector in aluminium (sheet with a thickness of 20 µm), a separator impregnated with a liquid electrolyte based on the $LiPF_6$ salt (1 mol/L) in solution in a mixture of ethylene carbonate and dimethyl carbonate.

Figure 4:
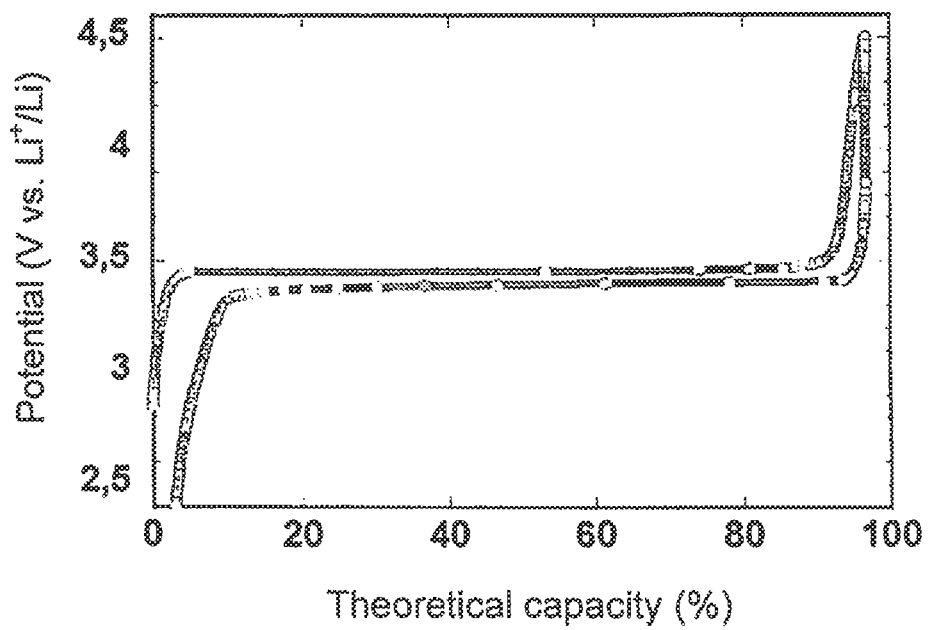
Figure 5:
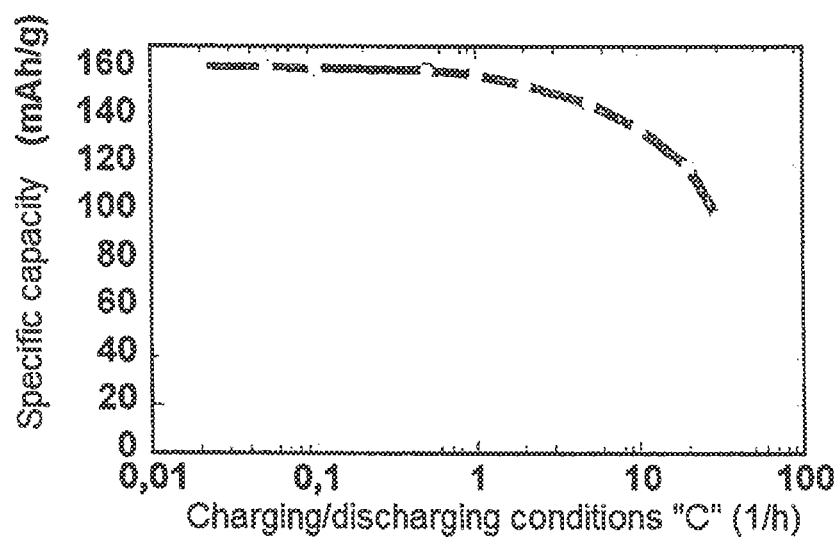
FIG. 5 illustrates the time-dependent change of the specific capacity of a LiFe$_{0.95}$B$_{0.033}$PO$_4$/C powder containing 2.5% by weight of carbon according to the invention depending on the imposed cycling rate conditions.
Figure 6:
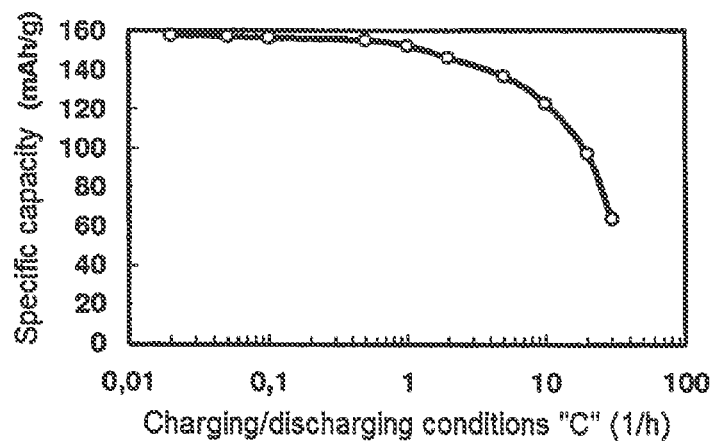
FIG. 6 illustrates the time-dependent change of the specific capacity of a LiFe$_{0.985}$B$_{0.010}$PO$_4$/C powder containing 2.5% by weight of carbon obtained according to example 5 according to the invention depending on the imposed cycling rate conditions.
Figure 7:
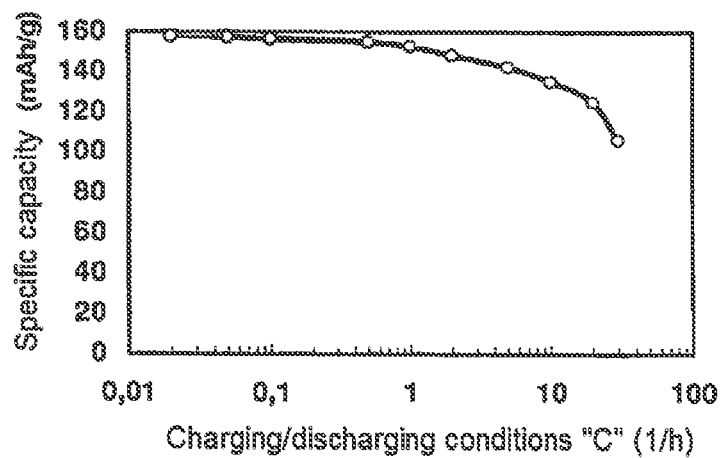
FIG. 7 illustrates the time-dependent change of the specific capacity of a LiFe$_{0.985}$B$_{0.010}$PO$_4$/C powder containing 2.5% by weight of carbon obtained according to another alternative of the method according to the invention depending on the imposed cycling rate conditions.

At room temperature, under C/5 cycling rate conditions (C representing the charging or the discharging and 5 being the number of hours), this system delivers a capacity of about 160 mAh/g and an average voltage of 3.4 V, as this may be seen in FIGS. 4 and 5.

Example 4

Formation of an Li-Ion Battery

A Li-ion battery was built from a positive electrode containing the composite $LiFe_{0.95}B_{0.033}PO_4/C$ of the invention, from a negative carbon electrode and from a commercial separator based on polypropylene and polyethylene, impregnated with a liquid electrolyte consisting of $LiPF_6$ (1 mol. $L.^{-1}$) in solution in a mixture of propylene carbonate, dimethyl carbonate and ethylene carbonate.

In particular the positive electrode consists of 90% by mass of $LiFe_{0.95}B_{0.033}PO_4/C$, 4% by mass of carbon (carbon fibers and carbon black in identical proportion) and of 6% by mass of polyvinylidene hexafluoride as a binder. The mixing is carried out in a solution of N-methylpyrroliodone. The formed ink is deposited on a current collector in aluminium so that the surface capacity is 3.8 mAh/cm². After evaporation of the solvent, the electrode is calendered so as to attain a porosity of 35%.

At room temperature, this battery has a rated energy which may exceed 160 Wh/kg.

Example 5

Formation of Said Composite Electrode Material According to the Invention According to an Industrializable Mechanosynthesis Step 1,500 g of $Fe_3(PO_4)_2.8H_2O$, 366 g of lithium phosphate $Li_3PO_4$, 31 g of boron phosphate $BPO_4$ and 150 g of cellulose are introduced into a 5 liter transfer container (for example: a glass bottle, the plug of which is replaced with a valve), also used as a metering and pre-mixing container. The contents of the container are inertized by an argon sweep for 10 mins with a flow rate of 6 L/min and then closed. The container is manually stirred for about 2 minutes in order to mix the powders until a mixture of a uniform color is obtained.

The pre-mixed powder is transferred in a confined way and under argon into the milling tank of a high energy milling machine Simoloyer®, available from Zoz GmbH, by means of a leak-proof connection system. The tank is in stainless steel, has an internal volume of 20 liters, is equipped with a stellite rota and is partly filled with 25 kg of steel 100C6 balls with a diameter of 5 mm. The tank is maintained under static argon. If necessary after loading the power, the tank is re-inertized (three applications of vacuum and re-pressurizations with argon) so that the atmosphere in the interior is oxygen-free during the milling.

The tank is cooled by circulation of water with a rate of 12 liters per minute in the jacket forming its walls. The milling is started, the speed of rotation of the rotor is 750 revolutions per minute with the purpose of achieving energetic milling. The duration of the milling is 15 minutes. The unloading of the powder is carried out in a confined way and with an argon sweep, the outlet of the tank is connected to a 3 liter recovery container. The speed of rotation of the rotor is 750 revolutions per minute during the unloading which lasts for 15 minutes.

The synthesis precursors are now activated (nanostructured intimate mixing). The powder may be stored under argon while waiting to be heat-treated.

A sample taken after 15 minutes of milling (before unloading) and a sample taken at the end of unloading (i.e. 30 minutes of actual milling) are heat-treated according to the calcination methods of example 2, put into a metal lithium battery and tested according to the methods of example 3.

At room temperature, under a C/10 discharge condition, the respective batteries deliver a specific capacity of 157 mAh/g (for 15 minutes of milling) and 155 mAh/g (for 15 minutes of milling plus 15 minutes of unloading).

Example 6

Formation of Said Composite Electrode Material According to the Invention, According to an Industrializable Mechanosynthesis Step 4,500 g of $Fe_3(PO_4)_2.8H_2O$, 1,152 g of lithium phosphate $Li_3PO_4$, 30 g of boron phosphate $BPO_4$ and 464 g of cellulose are introduced into the milling tank of a high energy milling machine of the attritor type, available from Union Process. The tank is in stainless steel, has an internal volume of 35 liters, is equipped with a stainless steel stirrer and is filled with balls in 100C6 steel.

The tank is continuously cooled. Milling is started, the speed of rotation of the stirrer is 230 revolutions per minute with the purpose of obtaining energetic milling. The duration of the milling is 2 hours.

The synthesis precursors are now activated (nanostructured intimate mixing). The powder may be stored under argon while waiting to be heat-treated.

A representative sample taken on the unloaded batch is heat-treated according to the calcination methods of Example 2, put into a metal lithium battery and tested according to the methods of Example 3.

At room temperature under a C/10 discharge condition, the accumulator delivers a specific capacity of 158 mAg/g.

Comparative Examples

Example 3 was reproduced several times except for the fact that the type and the duration of the milling were modified for the mixture of precursors. The data of the comparative examples were compared with those obtained with Examples 2, 5 and 6.

The table below groups the values of specific capacities measured under a C/10 discharge condition for thin and thick electrodes made and tested in a metal lithium battery of the "button cell" type according to example 3.

| Comparative example No. | Milling Machine | Balls | Maximum relative velocity of the balls (m/s) | Milling time | CSF | CSE |
|---|---|---|---|---|---|---|
| EC1 | Planetary balls | W carbide | 2.6 | 4 × 1 h | 154 | 143 |
| Ex2 | | carbide | 5.2 | 1 h | 160 | 158 |
| EC2 | Attritor | Stainless steel | 1.0 | 4 h | 143 | 127 |
| EC3 | | Stainless steel | 1.0 | 10 h | 158 | 143 |
| Ex6 | | Stainless steel | 2.85 | 2 h | 158 | 153 |
| EC4 | Simoloyer ® | Stainless steel | 3.75 | 4 h | 136 | 124 |
| EC5 | | Stainless steel | 3.75 | 16 h | 153 | 148 |
| Ex5 | | Stainless steel | 11.25 | 15 min | 157 | 152 |

CSF = specific capacity at C/10 for a thin electrode of the order of 0.4 mAh/cm$^2$ (mAh/g)
CSE = specific capacity at C/10 for a thick electrode of the order of 4 mAh/cm$^2$ (mAh/g)

For milling machines where the inertia of the balls plays a dominant role (such as planetary milling machines and Simoloyer®, unlike attritors), the nature of the balls via the density of their material (tungsten carbide: 14 g/cm$^3$, steel 7.8 g/cm$^3$) has an influence on the milling time for attaining a same morphological condition of the powder (size and compactness of the micrometric mixed aggregates and size of the nanometric particles). This condition mainly depends on the total milling energy transmitted to the powder, which in a first approximation varies proportionally with:

the density of the material of the milling balls.
the square of the maximum relative velocity of the milling balls.
the milling time (in the absence of clogging).

As this may be seen, Comparative Example 1 does not give the possibility of obtaining industrially a production of lithiated iron phosphate doped with boron/C on the one hand because it was carried out in a milling machine of the laboratory planetary type having a maximum capacity of 250 mL. Upon conducting the Comparative Example 1, clogging occurred, probably due to the nature of the precursors used which contained water. The container of the planetary milling machine was subject to manual unclogging several times (every hour), which, without however being sufficient, has an increased risk of possible contamination of the product. Accordingly, the energy transmitted by the balls to the precursors probably was not sufficiently high. A surface capacity of 143 mAh/g for a thick electrode of the order of mAh/cm$^2$ at C/10 is not sufficient for utilization according to the needs of the market for this obtained compound.

Example 2, as for it, gave the possibility of obtaining satisfactory thin and thick electrodes with a milling time reduced to 1 hour in a planetary milling machine. This is particularly surprising considering the milling times disclosed in prior documents, generally comprised between 8 and 10 hours. Unfortunately, laboratory planetary milling machines do not give the possibility of producing of the electrode material on an industrial scale, but this example is a good reference for the desired characteristics of the product according to the invention. Further, the balls were in tungsten carbide, which. allowed improvement in the efficiency of the milling and development of sufficient mechano-chemical energy in order to obtain a cathode material having the advantageous electrochemical characteristics according to the invention and in the form of micrometric mixed aggregates of nanometric particles.

The Comparative Examples 2 and 3 were conducted on an attritor with a capacity of 2.5 liters with steel balls. The maximum relative velocity of the balls was 1 m/sec. A scraper was used for continuously unclogging the contents of the attritor. In spite of this permanent unclogging, the energy provided to the contained precursors was not sufficient for providing a satisfactory product for thin or thick electrode applications. Further, in Comparative Example 3, the milling time was extended up to 10 hours for acting against the loss of energy given to the precursors during milling, without this being sufficient for the surface capacity CFE to be satisfactory, even if the CSF value (thin electrode surface capacity) was satisfactory.

The Comparative Examples 4 and 5 were conducted on a milling machine Simoloyer® with a maximum relative velocity of the balls of 3.75 m/sec. However, significant clogging was observed and even an extended duration of the milling time was not able to act against the loss of the energy given to the precursors contained in the milling machine. Further, for such milling machines which are great energy consumers, milling times of 4 hours and of even more than 16 hours are not acceptable for a large scale cost-efficient production. These comparative examples cannot be industrializable, not to mention the fact that the electrochemical performances are not satisfactory, whether this be with thick electrodes or with thin electrodes.

Example 5 according to the invention was carried out under the same conditions as Comparative Examples 4 and 5, except for the fact that the milling time was reduced to 15 minutes and that the maximum relative velocity of the balls was 11.25 m/sec. As this may be seen, the specific capacity values at C/10 for a thin electrode of the order of 0.4 mAh/cm$^2$ (mAh/g) and of specific capacity values at C/10 for a thick electrode of the order of 4 mAh/cm$^2$ (mAh/g) were 157 and 152 mAh/g, respectively, which is quite satisfactory for the market requirements. Further, the method is industrializable since the consumption of a 15 minute milling step at 11.25 m/sec is not very high and this type of milling machine exists on a large scale and may be utilized in a production process.

Example 6 according to the invention was carried out under the same conditions as the Comparative Examples 2 and 3 except for the fact that the milling time was reduced to 2 hours and that the maximum relatively velocity of the balls was 2.85 m/sec, continuous unclogging like in the Comparative Examples 2 and 3.

As this may be seen, the specific capacity values at C/10 for a thin electrode of the order of 0.4 mAh/cm$^2$ (mAh/g) and the specific capacity values of C/10 for a thick electrode of the order of 4 mAh/cm$^2$ (mAh/g) were 158 and 153 mAh/g respectively, which is quite satisfactory for the market requirements and is industrializable.

It is quite understood that the present invention is by no means limited to the embodiments described above and that many modifications may be provided thereto without departing from the scope of the appended claims.

The invention claimed is:
1. A method for producing a composite material of lithiated iron phosphate and of carbon comprising the steps:
forming a mixture of precursors containing at least lithium phosphate, iron(II) phosphate and a material containing carbon, under an inert atmosphere, milling said obtained mixture of precursors and calcining said milled mixture during which pyrolysis of the material containing carbon and formation of lithiated iron phosphate crystals occur, wherein said milling is industrial high energy ball nanomilling for a predetermined time sufficient for providing the mixture of precursors with sufficient mechanical activation energy for obtaining micrometric mixed aggregates of nanometric particles.

2. The method according to claim 1, wherein said predetermined time is at least four hours, advantageously about two hours, more preferentially less than half an hour and preferably for about 15 minutes.

3. The method according to claim 1, wherein the balls have a maximum relative velocity greater than 2 m/s, preferably greater than 4 m/s, more particularly greater than 6 m/s, and more preferentially greater than 8 m/s.

4. The method to according to claim 1, further comprising an additional milling step performed after calcination of the precursors.

5. The method according to claim 1, wherein said calcination step has a duration of less than 2 hours, preferably less than one hour, and more preferentially less than half an hour.

6. The method according to claim 1, wherein said mixture of precursors also contains a boron source, such as boron phosphate, boron carbide, or mixture thereof, and wherein said composite material of lithiated iron phosphate and of carbon is a composite material of lithiated iron phosphate doped with boron and of carbon.

7. The method according to claim 1, wherein said milling and/or calcination is carried out in an inert atmosphere, for example of argon.

8. The method according to claim 1, wherein said material containing carbon is cellulose.

* * * * *